United States Patent
Mantovani

(10) Patent No.: US 12,030,373 B2
(45) Date of Patent: Jul. 9, 2024

(54) TONNEAU COVER OPENING AND LOCKING SYSTEM

(71) Applicant: KEKO ACESSÓRIOS S/A, Caxias do Sul (BR)

(72) Inventor: Juliano Scheer Mantovani, Caxias do Sul (BR)

(73) Assignee: KEKO ACESSÓRIOS S/A, Flores da Cunha (BR)

( * ) Notice: Subject to any disclaimer, the term of this patent is extended or adjusted under 35 U.S.C. 154(b) by 0 days.

(21) Appl. No.: 17/615,483

(22) PCT Filed: May 19, 2021

(86) PCT No.: PCT/BR2021/050210
§ 371 (c)(1),
(2) Date: Nov. 30, 2021

(87) PCT Pub. No.: WO2021/232127
PCT Pub. Date: Nov. 25, 2021

(65) Prior Publication Data
US 2022/0234429 A1    Jul. 28, 2022
US 2024/0174065 A9    May 30, 2024

(30) Foreign Application Priority Data
May 21, 2020    (BR) .......................... 1020200101510

(51) Int. Cl.
*B60J 7/19*    (2006.01)
*B60J 7/10*    (2006.01)

(52) U.S. Cl.
CPC ............... *B60J 7/198* (2013.01); *B60J 7/104* (2013.01)

(58) Field of Classification Search
CPC .................................. B60J 7/104; B60J 7/198
(Continued)

(56) References Cited

U.S. PATENT DOCUMENTS

| | | |
|---|---|---|
| 5,121,960 A | 6/1992 | Wheatley |
| 5,487,585 A | 1/1996 | Wheatley |

(Continued)

FOREIGN PATENT DOCUMENTS

| | | |
|---|---|---|
| BR | 202015017622 U2 | 4/2016 |
| BR | MU8103687 Y1 | 10/2016 |

(Continued)

OTHER PUBLICATIONS

International Search Report and Written Opinion for PCT/BR2021/050210, dated Aug. 6, 2021.

*Primary Examiner* — Jason S Morrow
(74) *Attorney, Agent, or Firm* — Pilloff Passino & Cosenza LLP; Rachel K. Pilloff; Sean A. Passino

(57) ABSTRACT

The tonneau cover opening and locking system, object of the present invention, comprises a profile (10) provided with fastening and fitting components (30), (40), (50) and (80), actuated by rods (70), which contains a compensating mechanism for stretching the tarpaulin and which allows the user to perform the opening movement in an fast, quick and practical way, due to a set of actuators that facilitate user access and allow the easy release of the fixing locks. The system also incorporates solutions that increase the reliability and lifetime of mechanical locking. This new embodiment adds greater practicality to the tonneau cover locking and opening system, ensuring greater efficiency, lifetime, usability and greater flexibility in the opening and closing movement by the user.

20 Claims, 22 Drawing Sheets

(58) Field of Classification Search
USPC .......................... 296/100.15, 100.16, 100.18
See application file for complete search history.

(56) References Cited

U.S. PATENT DOCUMENTS

| | | | |
|---|---|---|---|
| 6,024,401 | A | 2/2000 | Wheatley et al. |
| 9,067,481 | B2 | 6/2015 | Xu |
| 9,981,537 | B2 * | 5/2018 | Xu .......................... B60J 7/104 |
| 10,471,815 | B2 | 11/2019 | Carter et al. |
| 10,500,934 | B1 * | 12/2019 | Weng ..................... B60J 7/1858 |
| 10,538,150 | B2 * | 1/2020 | Zichettello ............... B60J 7/068 |
| 10,800,234 | B2 * | 10/2020 | Dylewski, II ........... B60J 7/198 |
| 11,027,603 | B1 * | 6/2021 | Zheng ..................... B60J 7/198 |
| 11,084,361 | B2 * | 8/2021 | Dylewski, II ........... B60R 5/047 |
| 2001/0020792 | A1 | 9/2001 | Huotari |
| 2002/0109371 | A1 | 8/2002 | Wheatley |
| 2003/0057726 | A1 | 3/2003 | Wheatley |
| 2004/0245800 | A1 | 12/2004 | Wheatley |
| 2006/0255615 | A1 | 11/2006 | Malmberg et al. |
| 2007/0096558 | A1 * | 5/2007 | Costa ..................... B63B 17/02 305/116 |
| 2018/0111460 | A1 * | 4/2018 | Xu .......................... B60J 7/104 |
| 2018/0297457 | A1 | 10/2018 | Spencer |
| 2020/0346533 | A1 * | 11/2020 | Dylewski, II ............. B60P 7/02 |
| 2022/0001730 | A1 * | 1/2022 | Cai ......................... B60J 7/198 |
| 2022/0176786 | A1 * | 6/2022 | Dylewski, II ........... B60J 7/141 |
| 2022/0234429 | A1 * | 7/2022 | Mantovani ............... B60J 7/104 |

FOREIGN PATENT DOCUMENTS

| | | |
|---|---|---|
| CN | 203752989 U | 8/2014 |
| CN | 206954085 U | 2/2018 |
| CN | 208393072 U | 1/2019 |
| WO | 2019119088 A1 | 6/2019 |

* cited by examiner

Section AA

TONNEAU COVER OPENING AND LOCKING SYSTEM

FIELD OF THE INVENTION

The present invention describes a tonneau cover opening and locking system with tarpaulin stretch mechanism. More specifically, it comprises a profile provided with fixing and fitting components activated by rods, which allow the user to perform the opening movement in a fast, quick and practical way due to a set of modular and ergonomic actuators facilitating user access and allowing easy release of fixing latches. The system also has a mechanism provided with springs that keep the tarpaulin always stretched and make the closing smoother and friendlier.

This new embodiment adds greater practicality to the tonneau cover locking and opening system, ensuring greater efficiency, lifetime, reliability and greater flexibility in the opening and closing movement, in addition to ensuring that the tarpaulin is always stretched when closed.

BACKGROUND OF THE INVENTION

Light cargo vehicles, similar to a pickup truck, with a driver cabin and open bed are suitable for receiving the cover, which may or may not fall back, completely covering the bed.

The tonneau cover consisted of a set of profiles generally forming a rectangle, which will be attached to the vehicle's bed in order to allow the cover to be fixed.

Currently there is a wide variety of covers to cover pickup trucks, closing the bed and leaving it stretched out, so that each model has a fixing and locking system that allows its closing and opening.

Initially, the cover models were equipped with a system of traction straps attached to the vehicle body, which caused several inconveniences to users due to the delay in opening and closing, resulting in a system with low practicality.

Current models describe locking and opening systems equipped with pins that allow easier fixing and unlocking, but current systems have several inconveniences to users due to the difficulty of simultaneous unlocking on both sides and the difficulty of operating with the tailgate open on taller pickup trucks or for people with short stature, due to the central drive position or on both sides simultaneously.

In addition, the embodiment and fitting way of the pins allow the system to malfunction and premature component wear, which results in difficulty opening and closing and even spontaneous unlocking and, consequently, the cover opening during the vehicle movement. Current systems do not have a tarpaulin compensation and stretching mechanism, which causes tarpaulin expansions and contractions to interfere with the system's operation.

Thus, the present inventor seeking to solve the inconveniences of the market developed an easy-to-use system that allows for greater convenience in locking and unlocking the cover, in addition to compensating for thermal expansion and ensuring perfect stretching of the tarpaulin through an embodiment that ensures greater efficiency and flexibility in the opening and closing movement, modularity in the drive system and durability of the system components. The modular drive system allows to position two or more actuators in one same profile, resulting in a greater possibility of combinations, which allows to serve a wide variety of trucks in the national and international market.

In search performed in the prior art, several documents were identified describing locking systems applied to tonneau covers, wherein it can be highlighted the following document:

BRMU8103687-6, of the same owner, describes a locking system for tonneau covers aiming to lock the rear cover closing in an fast, safe and practical way, as well as unlocking, with a single touch, both sides simultaneously.

U.S. Ser. No. 10/471,815 (Tonneau Cover, 2017) which describes an set having a latch in communication with the plate, the latch having a finger that is adapted to engage the cover stopper and a shaft that is connected to the plate at one end, and the other end the shaft has a pin that is adapted to engage a defined slot in the latch. Removing force from the plate causes the plate to move in the third direction, which causes the latch to move in the fourth direction, so the cover is moved to an open configuration.

CN208393072 (Xu Enli, 2018) describes a cover locking structure of the recovery compartment, which is equipped with a horizontal structure between the trunnion frame fixed with the carriage, connects through the connection seat between the trunnion frame and the horizontal frame. This locking structure can change the compartment cover switch, improving the disassembly efficiency in a flexible way. The different amendment products can also adjust the degree of elasticity above the compartment cover leather.

These prior art documents describe a cover locking and opening system provided with an embodiment having a large number of components which generates several inconveniences for users, resulting in problems with closing and opening the device.

US20180297457 (Truxedo, 2017), CN206954085 (Ningbo, 2017), CN203752989 (Changzhou, 2014), and U.S. Pat. No. 9,067,481 (Cixi City, 2012) describe locking and opening systems applied in tonneau covers so that each document describes and shows an unique embodiment of activation and fixation, so that the subject matter claimed in these documents does not describe a system activated by rods and a system provided with a mechanism with springs always leaving the tarpaulin stretched and making the closing smoother and friendlier.

Therefore, the present inventor seeking to solve the inconveniences of the prior art developed a new embodiment applied to the locking system of tonneau covers, improving the previous system, in order to improve the efficiency in the assembly of the profiles, the cover locking and unlocking system and further improve the operating and increase the durability and reliability of the locking system. Thus, improving the fixing way between the profiles, the fitting system, release of the locking system and tarpaulin compensation and stretching system when compared to the mechanisms currently used in the market. In addition, the system has several innovations that reduce the number of fasteners and components, which reduces the product assembly process.

Thus, the object of the present invention is an opening and locking system of tonneau cover that describes a profile equipped with fixing and fitting components actuated by rods, which may contain a compensating mechanism for stretching the tarpaulin and allowing the user to perform the opening movement in a fast, quick and practical way due to a set of actuators that facilitate the user's access and allow the easy release of the fixation locks. The system also incorporates solutions that increase the reliability and durability of mechanical locking. This new embodiment adds greater practicality to the tonneau cover locking and opening system, ensuring greater efficiency, lifetime, usability and greater flexibility in the opening and closing movement by the user.

SUMMARY OF THE INVENTION

Due to the drawbacks identified in the prior art, an opening and locking system with the following characteristics is the object of the present invention:

It is characteristic of the present invention a tonneau cover opening and locking system providing a profile that allows the easy fixing of the locking structures along the ends and the fixing and movement of the actuators.

It is characteristic of the present invention a tonneau cover opening and locking system providing actuators endowed by an unique embodiment that allows its arrangement close to the profile and fixing of the actuation rods of the system.

It is characteristic of the present invention a tonneau cover opening and locking system that provides locking structures arranged along the ends of the profile, which have a unique embodiment that allows easy fixing and arrangement of spacings that allow the fitting of a second structure allowing locking and unlocking of the assembly.

It is characteristic of the present invention a tonneau cover opening and locking system that provides a terminal connected to the side profiles that allows positioning of the second locking structure.

It is characteristic of the present invention a tonneau cover opening and locking system that provides an embodiment improving the tarpaulin stretch.

It is characteristic of the present invention a tonneau cover opening and locking system providing a system of profiles equipped with fastening and fitting components activated by rods, which allow the user to perform the opening movement in a fast, quick and practical way.

It is characteristic of the present invention a tonneau cover opening and locking system providing a set of modular and ergonomic actuators that facilitate user access and allow easy release of the opening locks.

It is characteristic of the present invention a tonneau cover opening and locking system providing a mechanism equipped with springs that keep the tarpaulin always stretched and makes smoother and more friendly the closing.

It is characteristic of the present invention a tonneau cover opening and locking system providing an embodiment that adds more practicality to the tonneau cover locking and opening system, ensuring greater efficiency, lifetime, reliability and greater agility in the opening and closing movement.

It is characteristic of the present invention a tonneau cover opening and locking system providing an embodiment that ensures that the tarpaulin is always stretched when closed.

DESCRIPTION OF THE INVENTION

Figure 1:
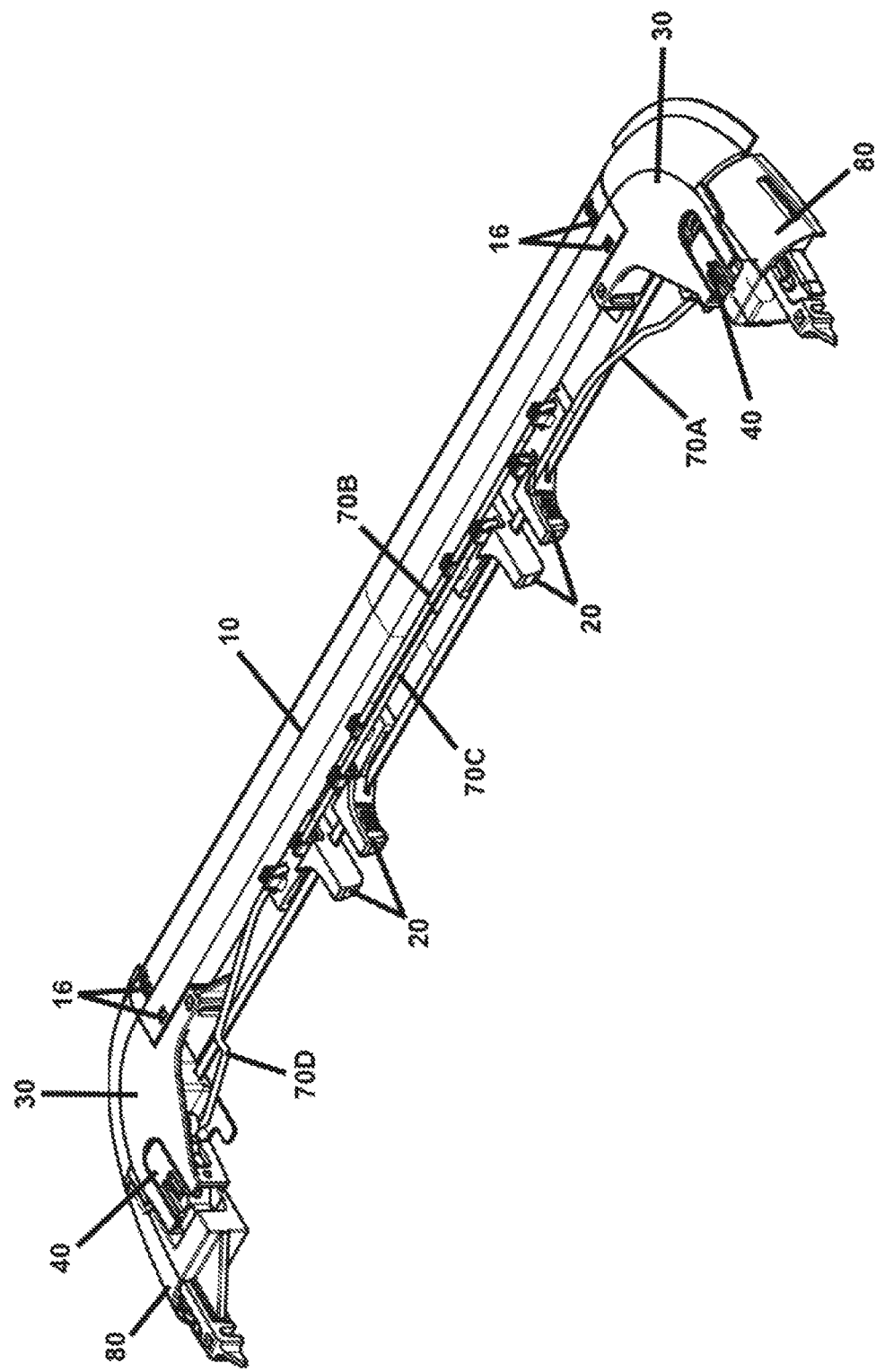
FIG. 1 shows a perspective view of the opening and locking system.
Figure 2:
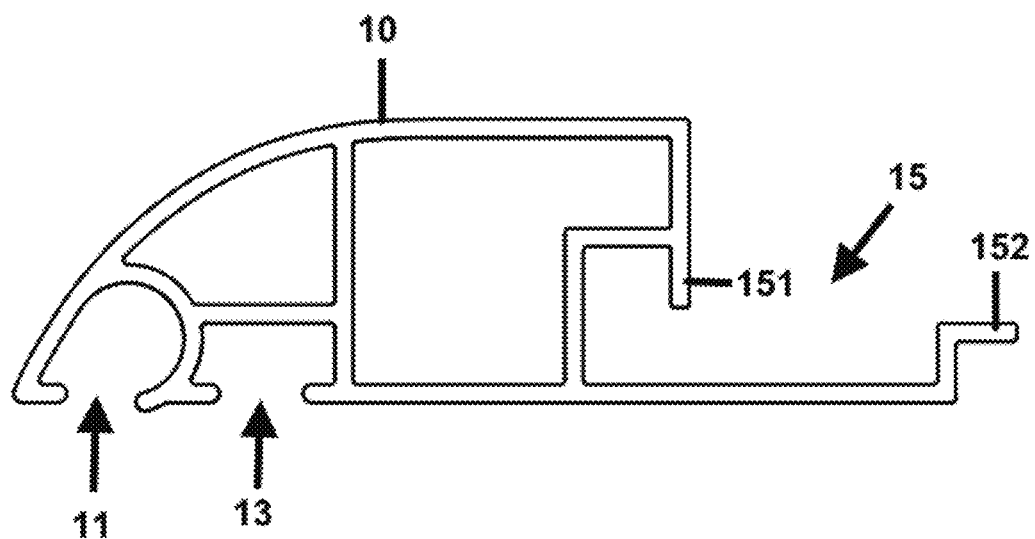
FIG. 2 shows the profile view detailing its embodiment.
Figure 3:
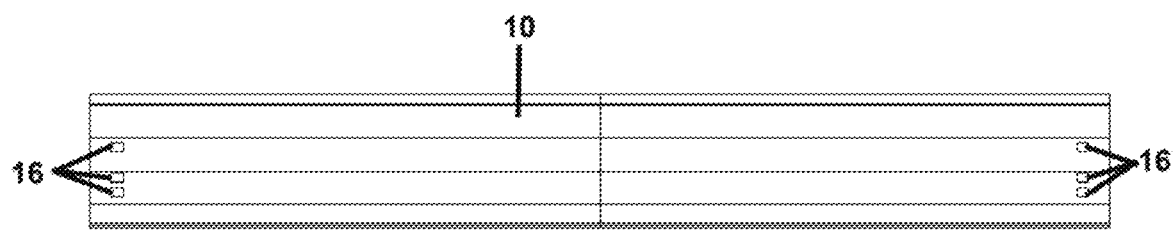
FIG. 3 shows the top view of the profile detailing its embodiment.
Figure 4:
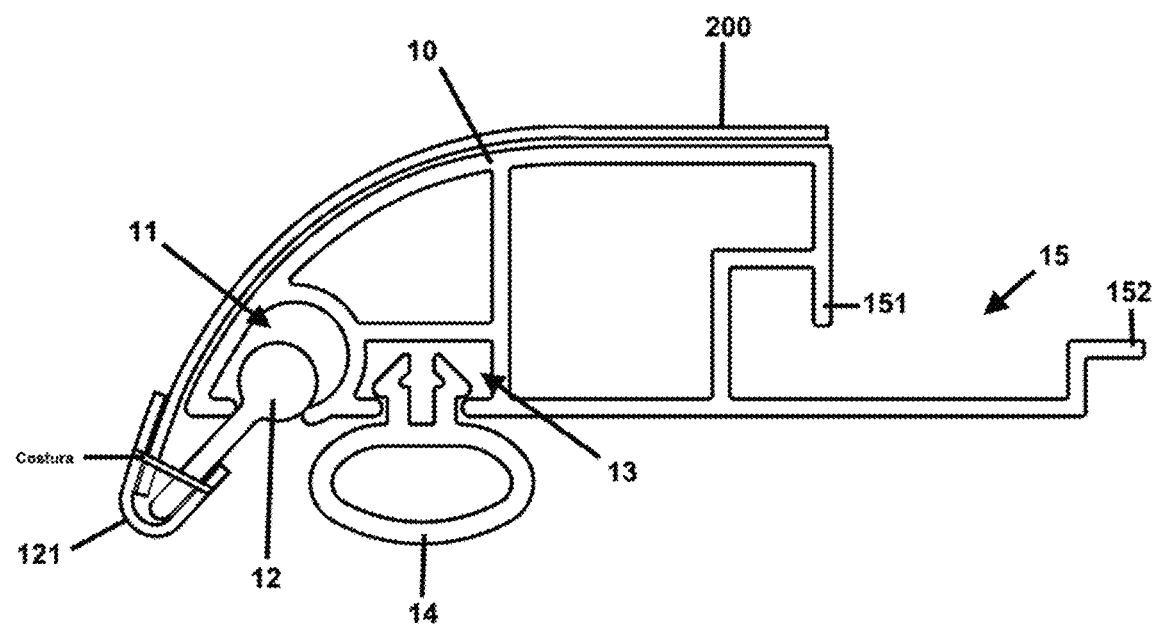
FIG. 4 shows the profile view detailing the plastic profiles and the arrangement of the tarpaulin, highlighting the stitching.
Figure 5:
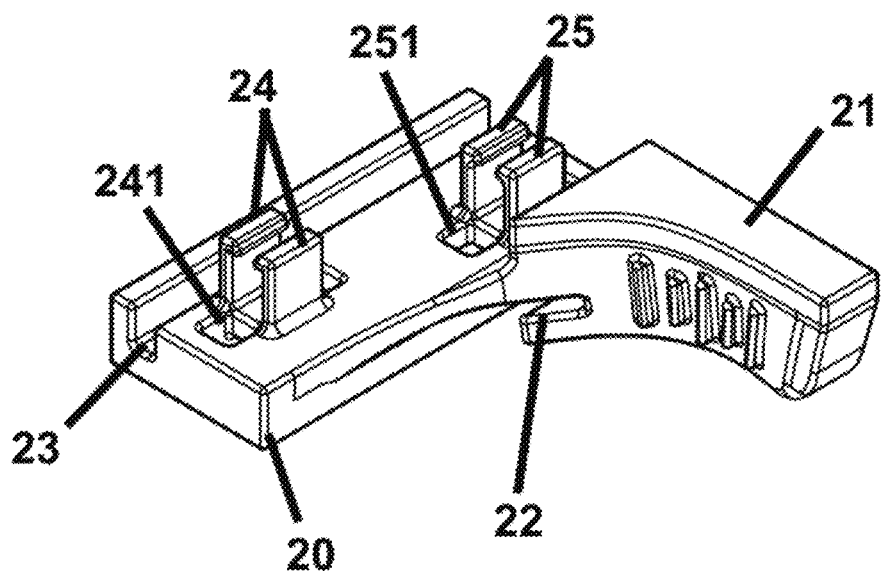
FIG. 5 presents the perspective view of the actuator detailing its embodiment.
Figure 6:
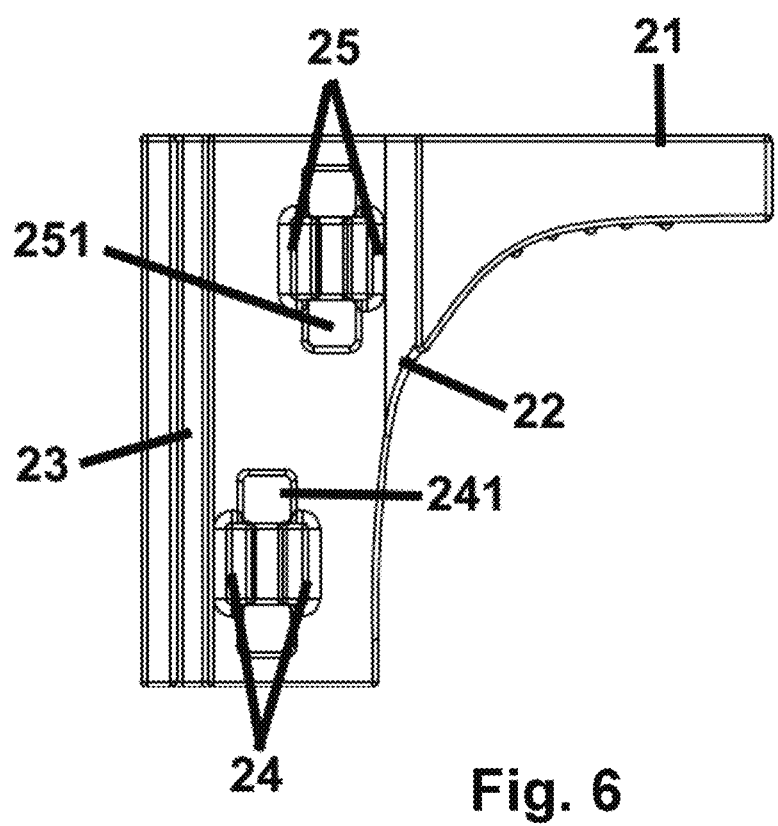
FIG. 6 shows the top view of the actuator detailing its embodiment.

The tonneau cover opening and locking system, object of the present invention, comprises a profile (10) provided with a set of actuators (20) and locking structures (30) arranged at the ends of the profile and fixed by projections (31) to the holes (16), with the set of profile (10) and structures (30) being connected to the terminals (80) of the side profiles, which allows for easy opening and closing of the cover.

The profile (10) has a lower spacing (11) wherein the tarpaulin will be fitted through a plastic profile (12) sewn on the tarpaulin and a cavity (13) for arranging a second sealing profile (14). In the posterior portion, the profile has spacing (15) provided by projections (151) and (152) that allow the fitting and displacement of the actuators (20).

The profile (12) is fitted laterally in the spacing (11) of the profile (10) allowing the tarpaulin to be fixed to the structure. The fixation of the profile (12) to the tarpaulin (200) occurs by sewing so that an edging (121) is used, arranged on the edge of the tarpaulin with the profile (12), ensuring greater resistance to the seam and preventing the mesh from falling apart.

The profile (14) is fitted in the spacing (13) of the profile (10) upwardly, ensuring greater sealing at the time of closing.

The pair of actuators (20) is formed by two symmetrical parts and describes a projection (21) provided with a groove (22) that allows the fitting with the projection (152) and a groove (23) that fits with the projection (151) of the profile (10), said projection (21) having an ergonomic shape for the positioning of the user's fingers. The actuators (20) have projections (24) provided with holes (241) and projections (25) provided with holes (251), said projections (24) and (25) allowing the fixing and positioning of the system actuation rods.

Figure 7:
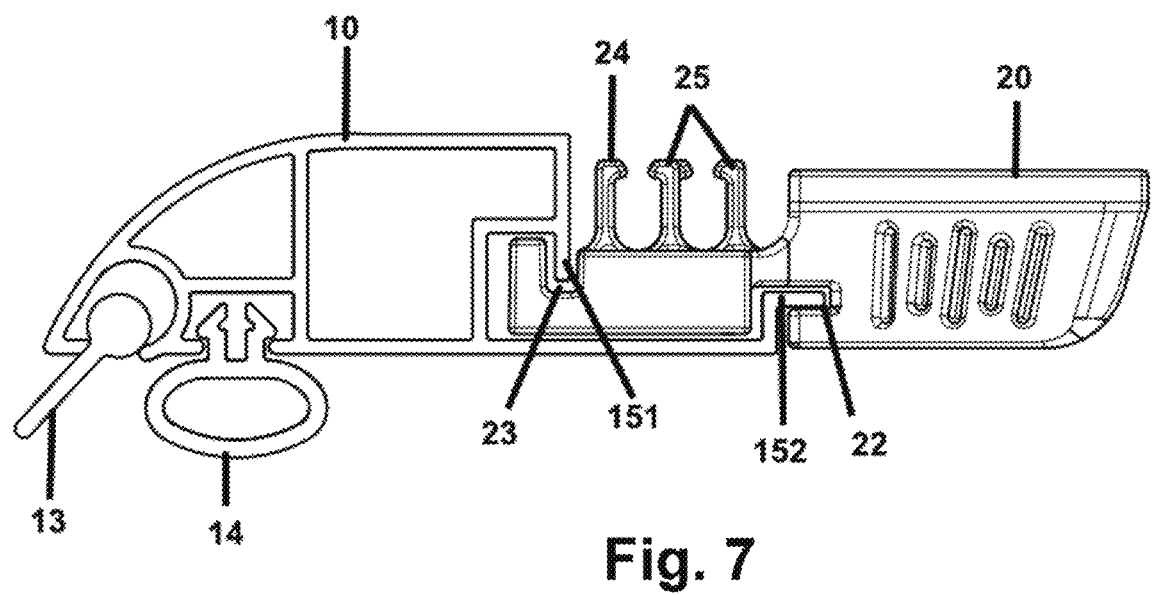
FIG. 7 shows the view of the profile provided by the plastic profiles and with the arrangement of the actuator, detailing the way of fixing and fitting.
Figure 8:
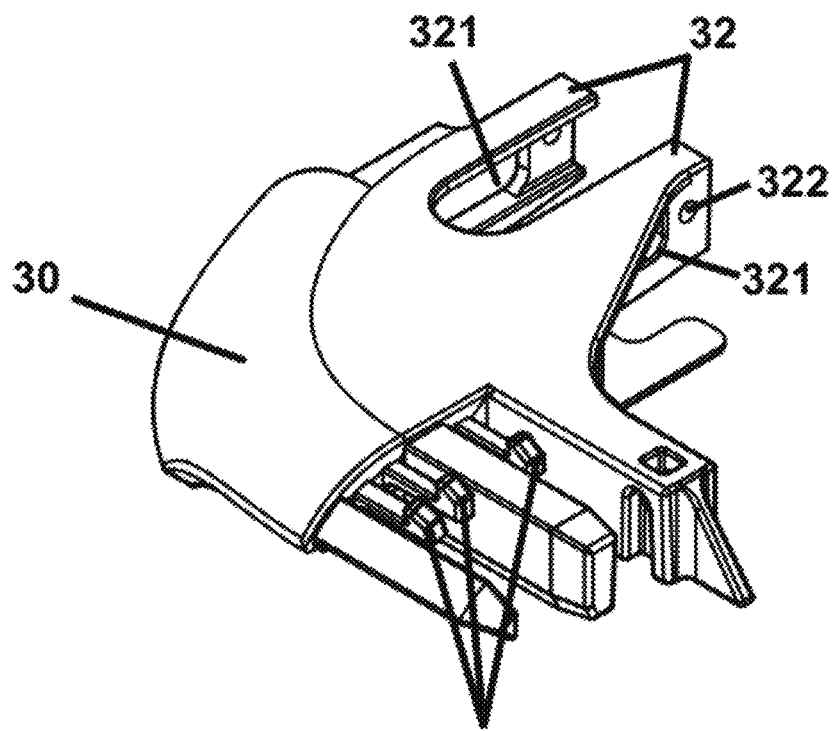
FIG. 8 presents the perspective view of the locking structure, detailing its embodiment.
Figure 9:
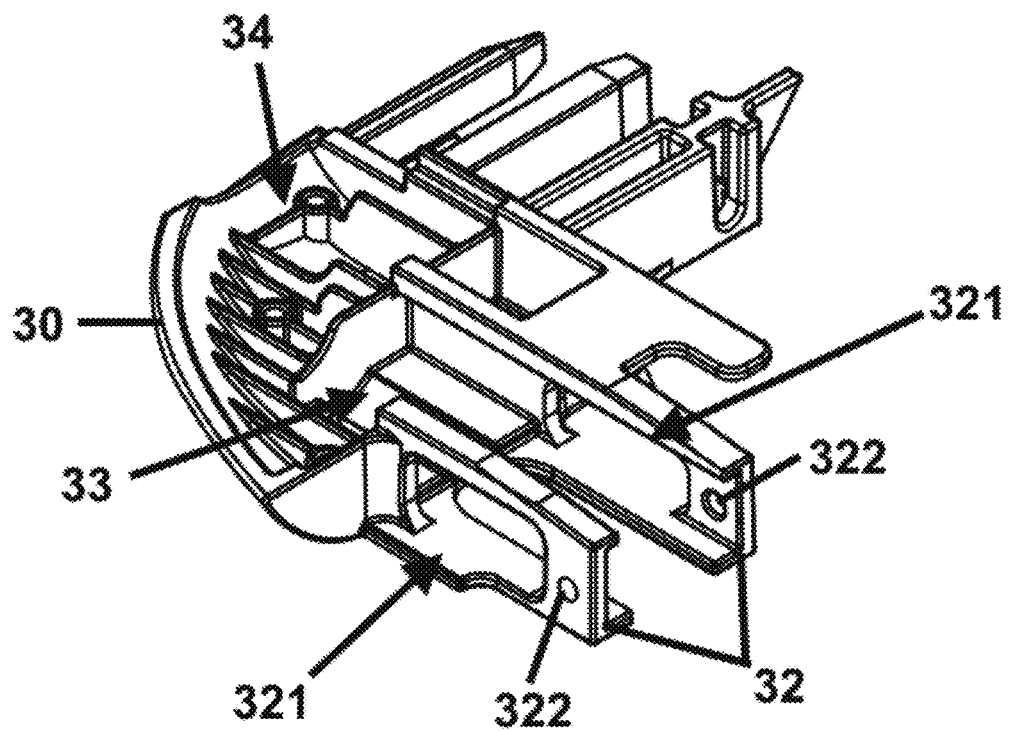
FIG. 9 shows the lower perspective view of the locking structure, detailing its embodiment.
Figure 10:
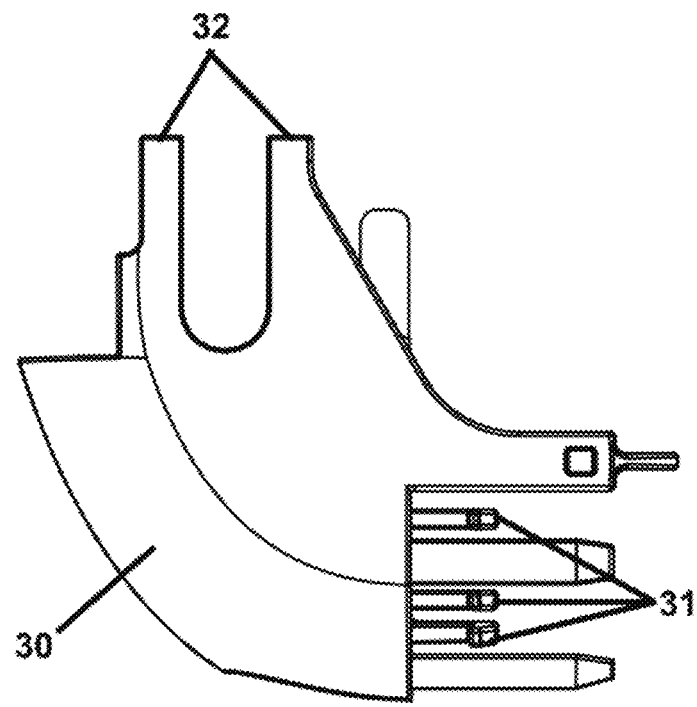
FIG. 10 shows the top view of the locking structure, detailing its embodiment.
Figure 11:
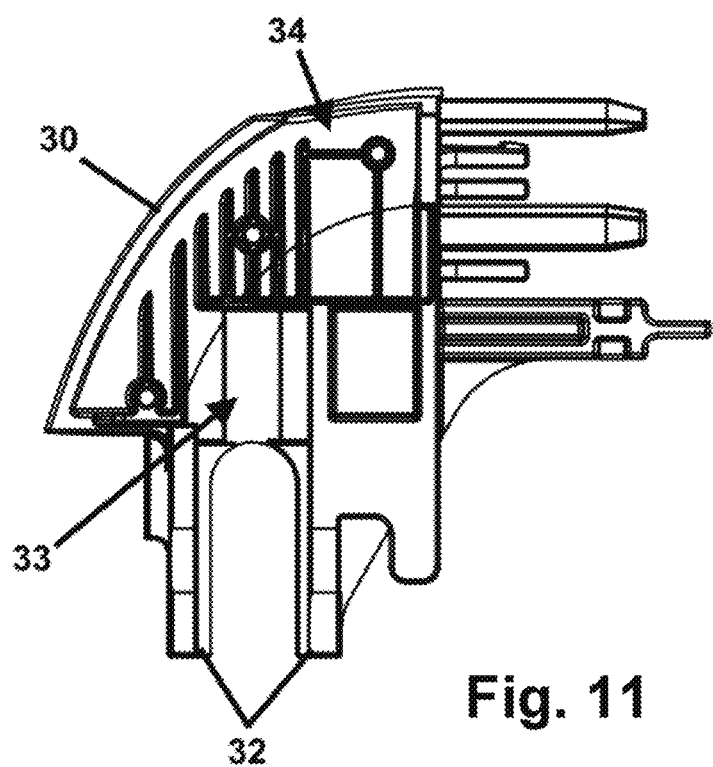
FIG. 11 shows the bottom view of the locking structure, detailing its embodiment.
Figure 12:
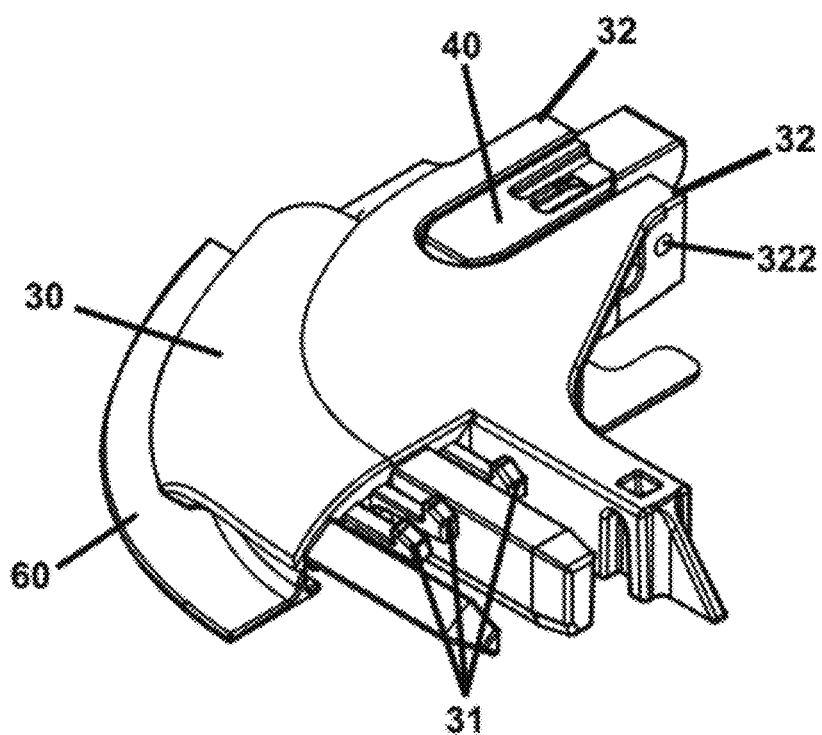
FIG. 12 shows the perspective view of the locking structure with the attachment of the movement structure, detailing its embodiment.
Figure 13:
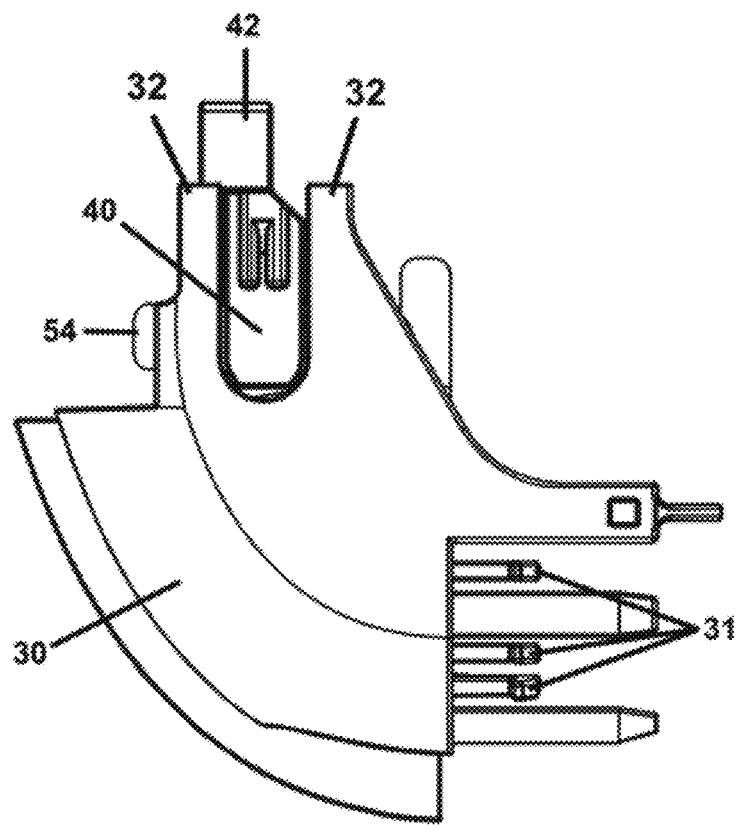
FIG. 13 shows the top view of the locking structure with the attachment of the movement structure, detailing its embodiment.
Figure 14:
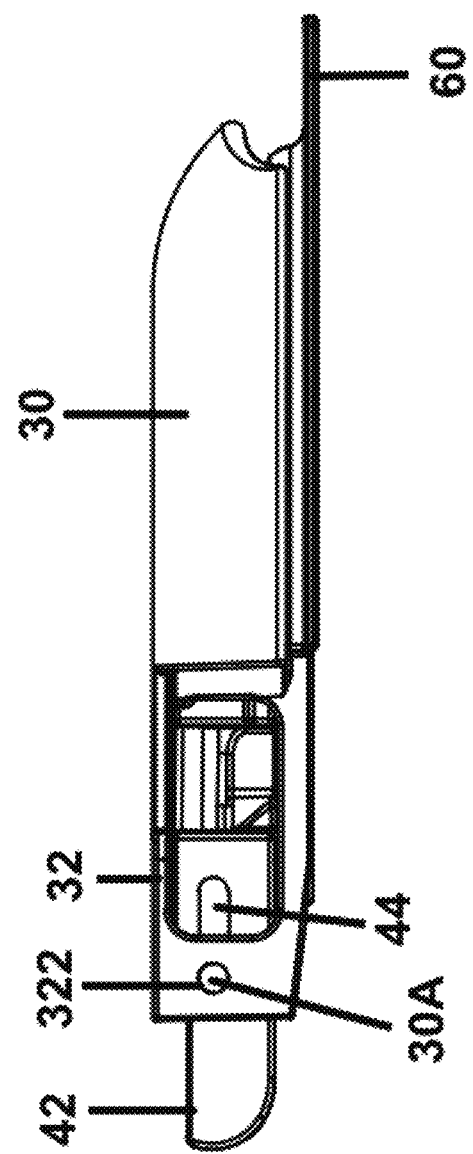
FIG. 14 shows the side view of the locking structure with the fixing of the movement structure, detailing its embodiment and pin fixation to the oblong hole.
Figure 15:
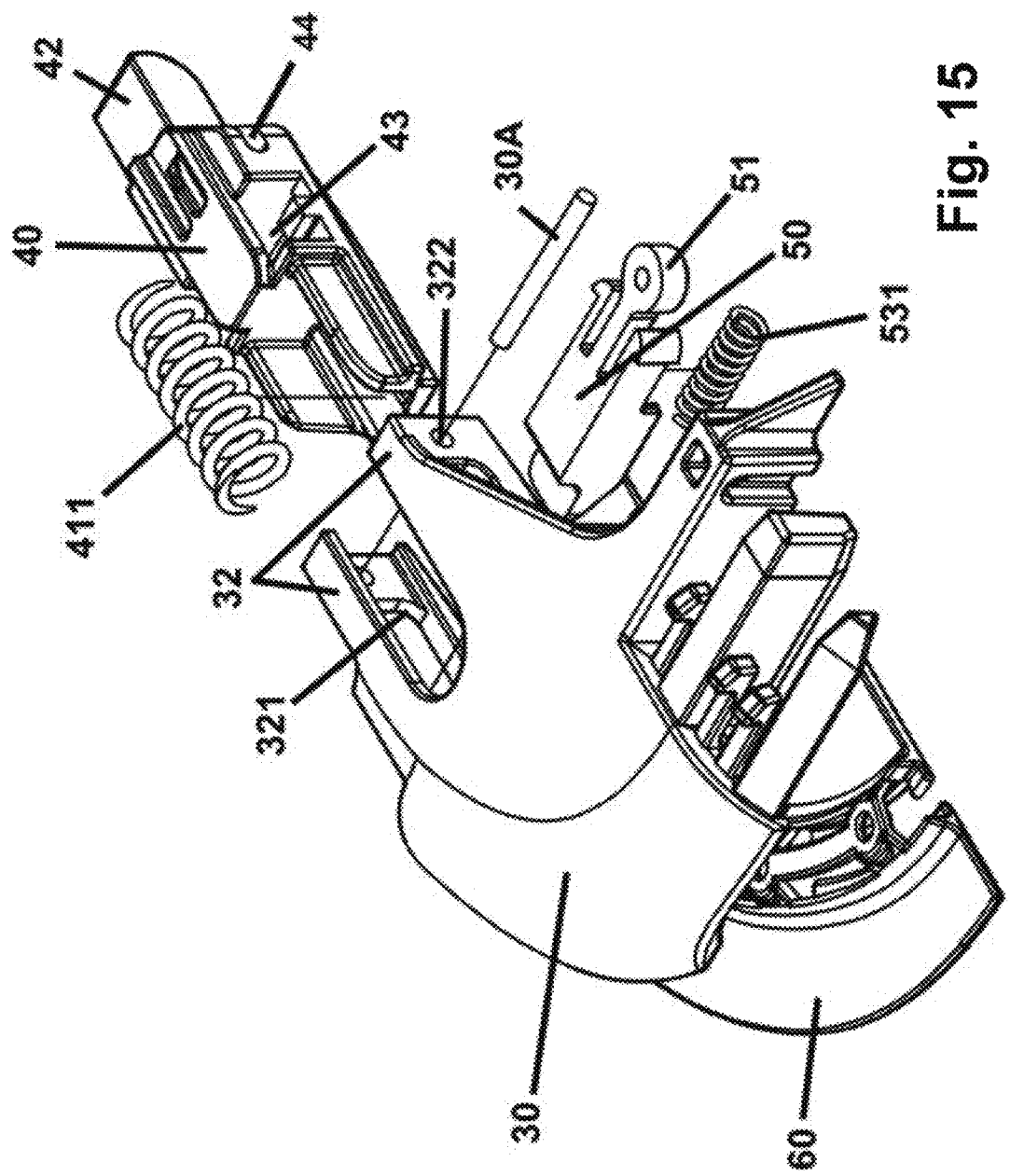
FIG. 15 shows the exploded view of the locking structure provided by the movement structure and latch pin, detailing the embodiment.
Figure 16:
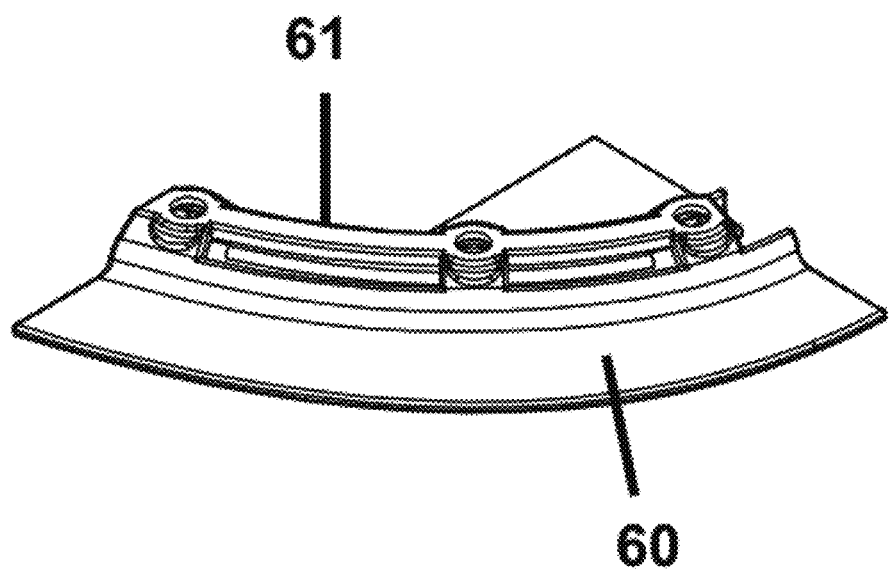
FIG. 16 shows a perspective view of the auxiliary part attached to the lower portion of the locking structure.
Figure 17:
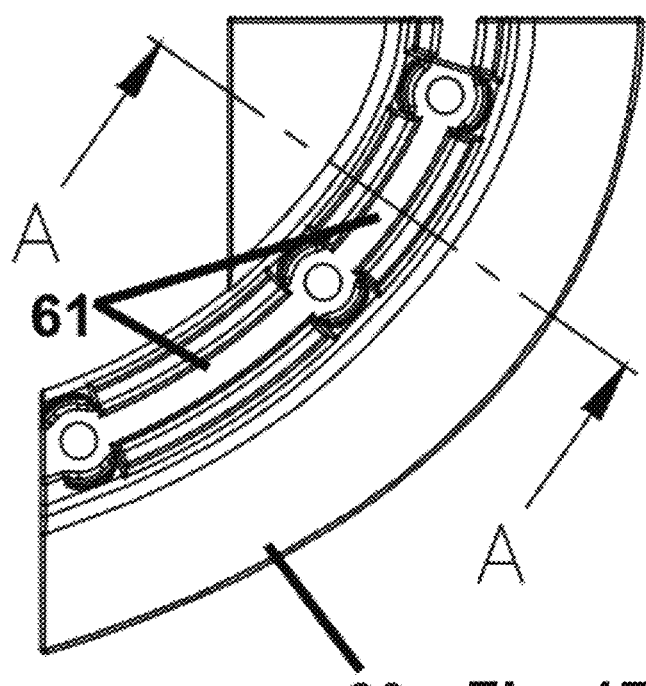
FIG. 17 shows the top view of the auxiliary part attached to the lower portion of the locking structure.
Figure 18:
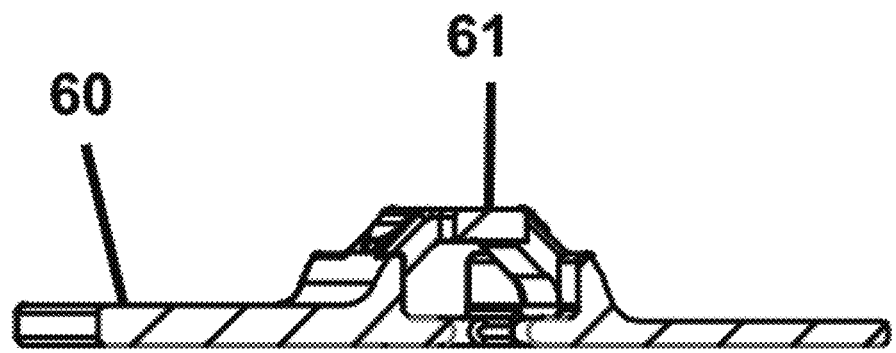
FIG. 18 shows the sectional view of the auxiliary part, detailing the fixation design.
Figure 19:
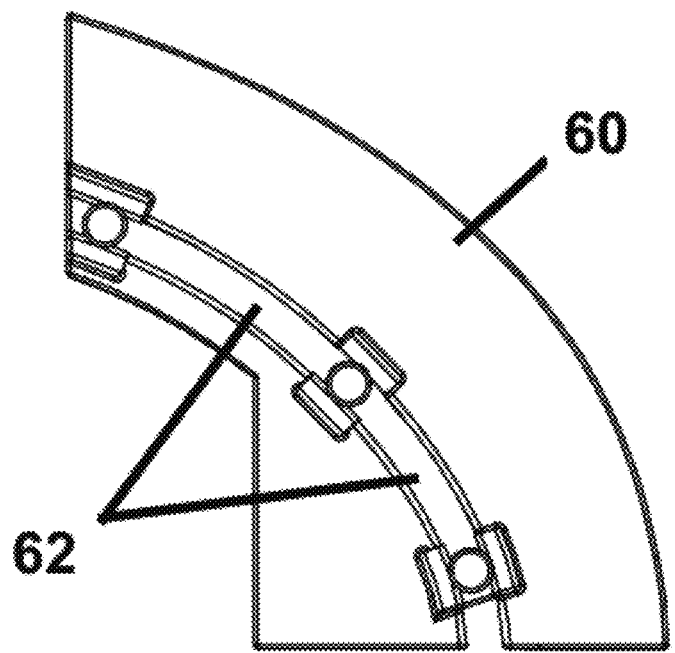
FIG. 19 shows the bottom view of the auxiliary part attached to the lower portion of the locking structure.
Figure 20:
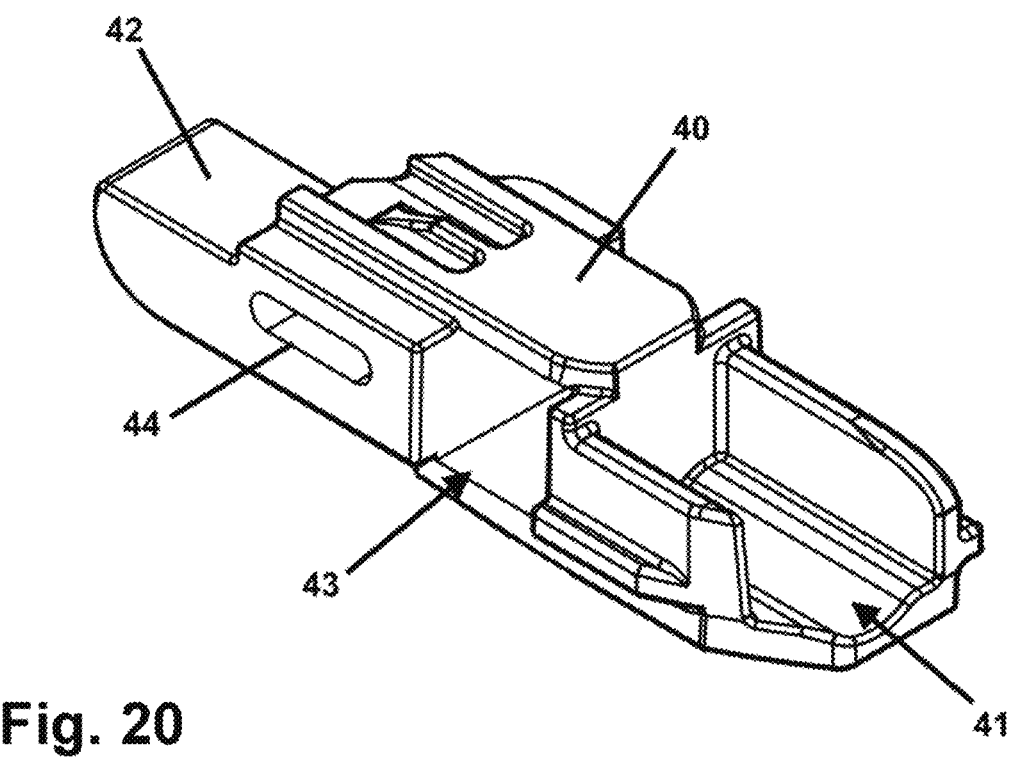
FIG. 20 shows the perspective view of the movement structure attached to the locking structure, detailing its embodiment.
Figure 21:
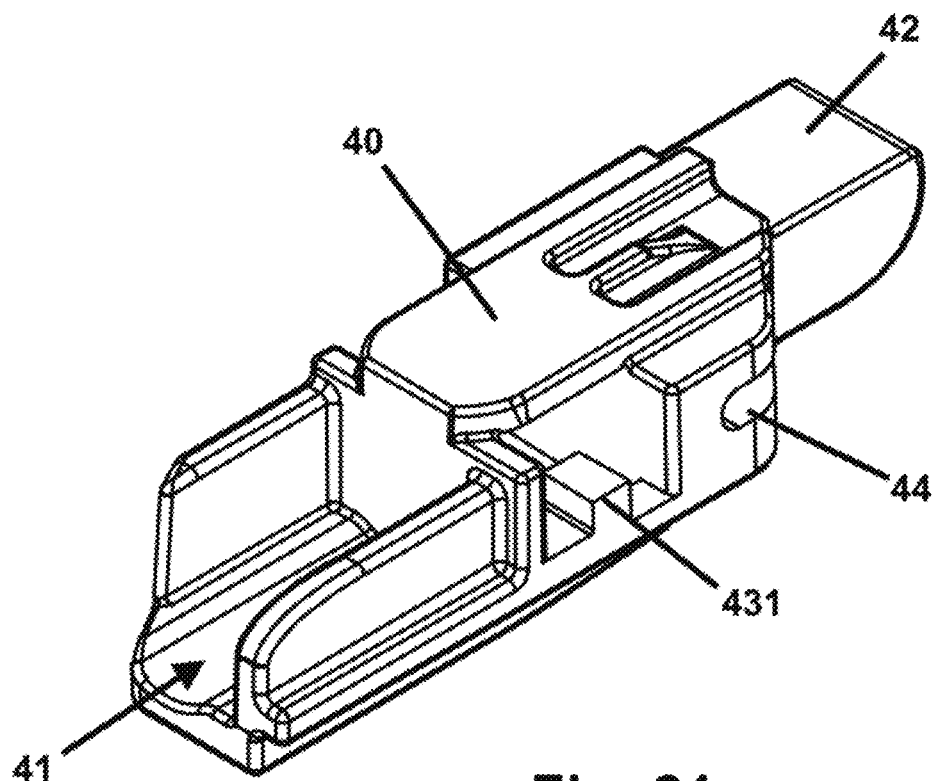
FIG. 21 shows the lateral perspective view of the movement structure attached to the locking structure, detailing its embodiment.
Figure 22:
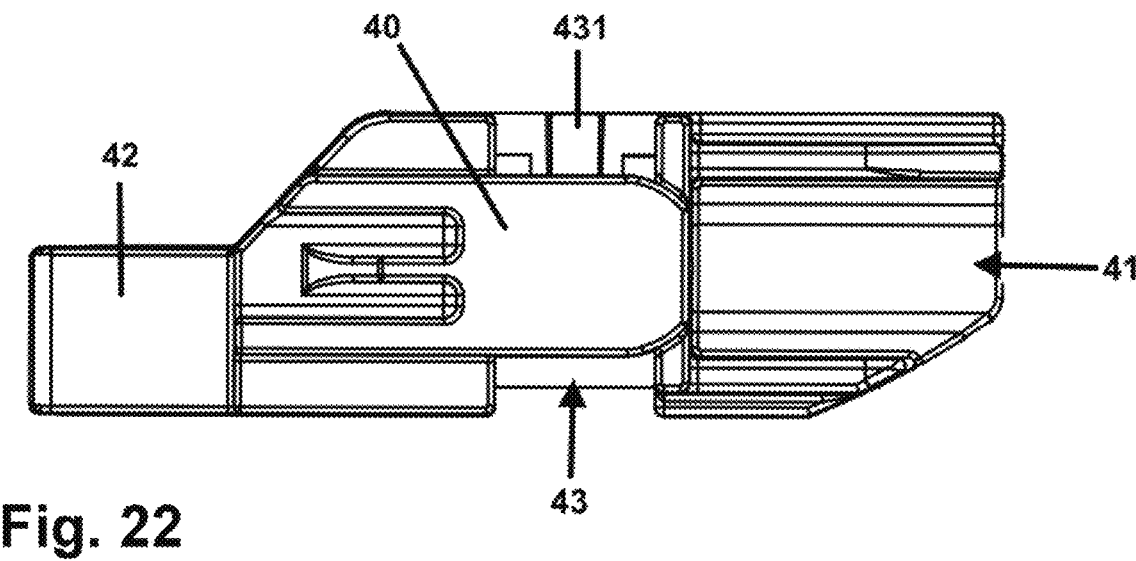
FIG. 22 shows the top view of the movement structure attached to the locking structure, detailing its embodiment.
Figure 23:
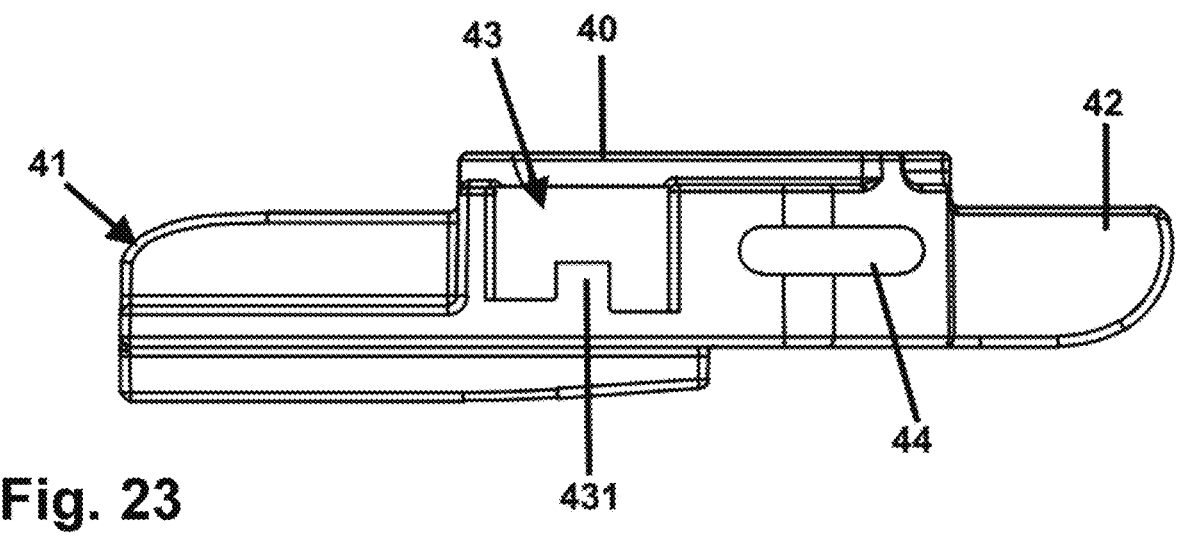
FIG. 23 shows the side view of the movement structure attached to the locking structure, detailing its embodiment.
Figure 24:
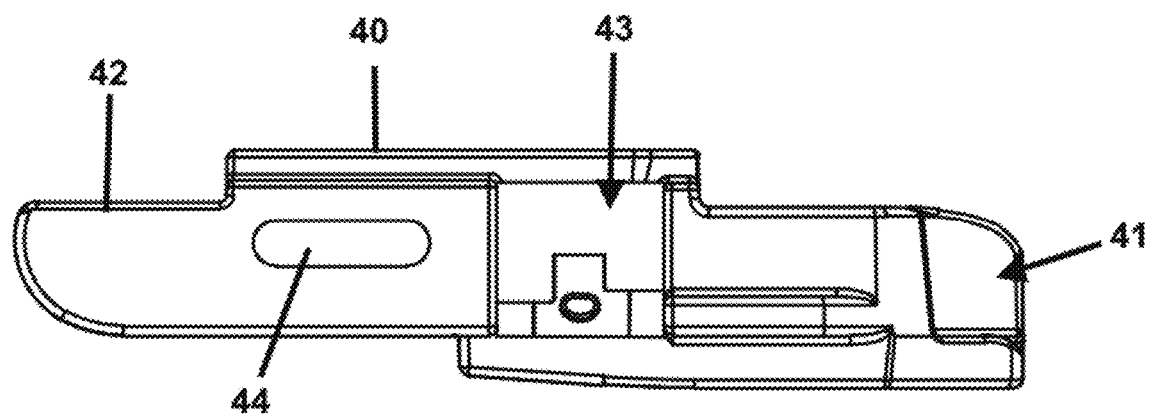
FIG. 24 shows the opposite side view of the movement structure fixed with the locking structure, detailing its embodiment.
Figure 25:
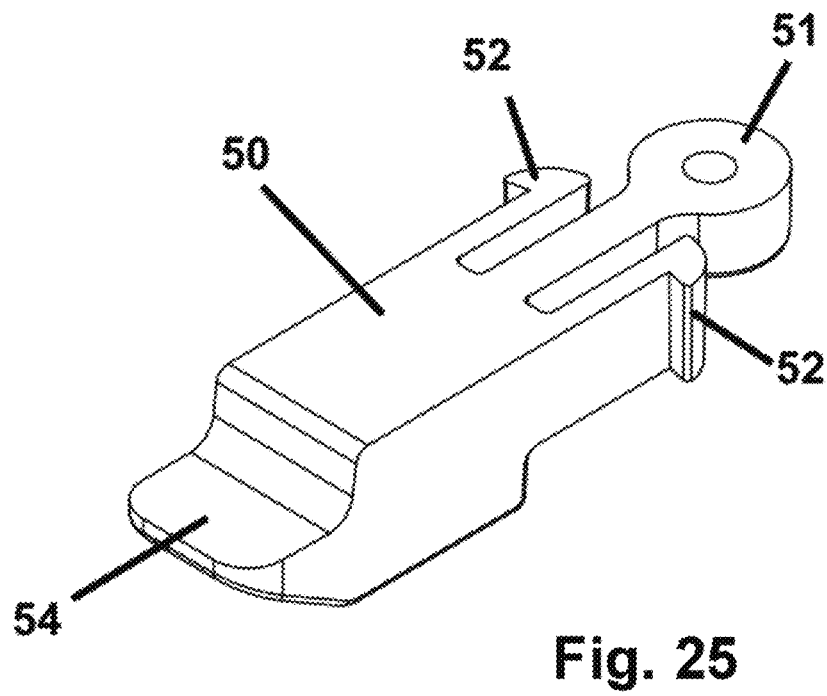
FIG. 25 shows the perspective view of the latch pin attached to the movement structure, detailing its embodiment.
Figure 26:
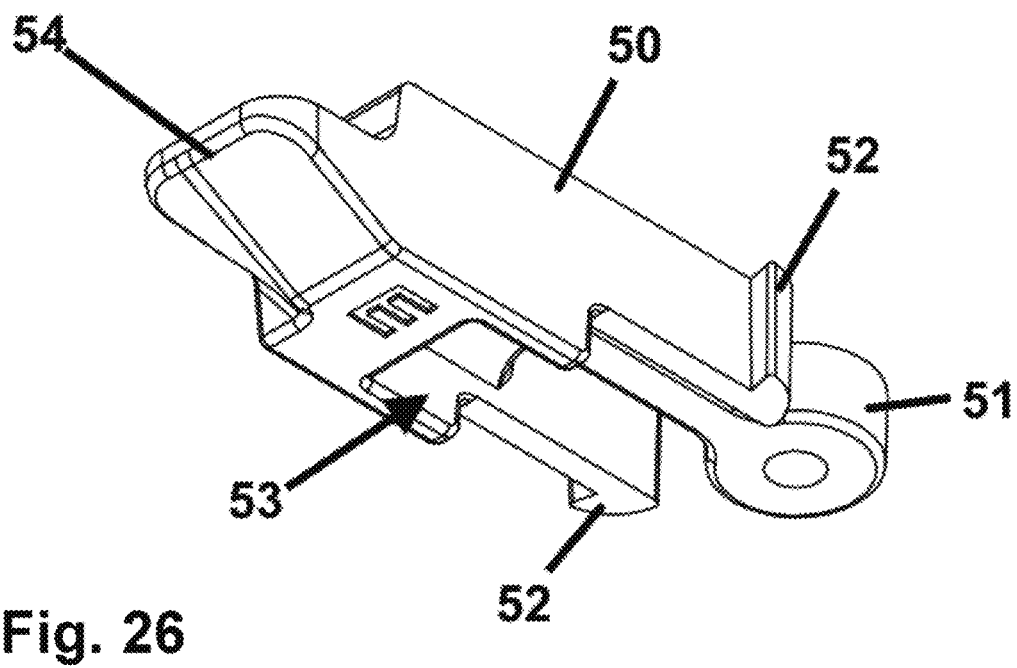
FIG. 26 shows the bottom perspective view of the latch pin attached to the movement structure, detailing its embodiment.
Figure 27:
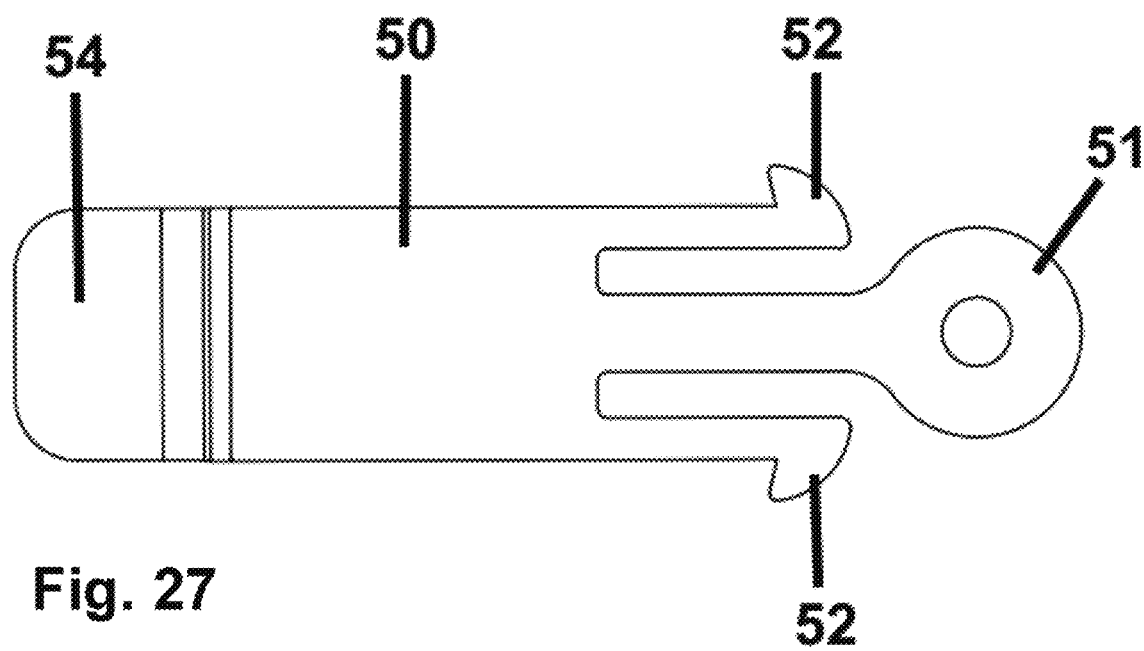
FIG. 27 shows the top view of the latch pin attached to the movement structure, detailing its embodiment.
Figure 28:
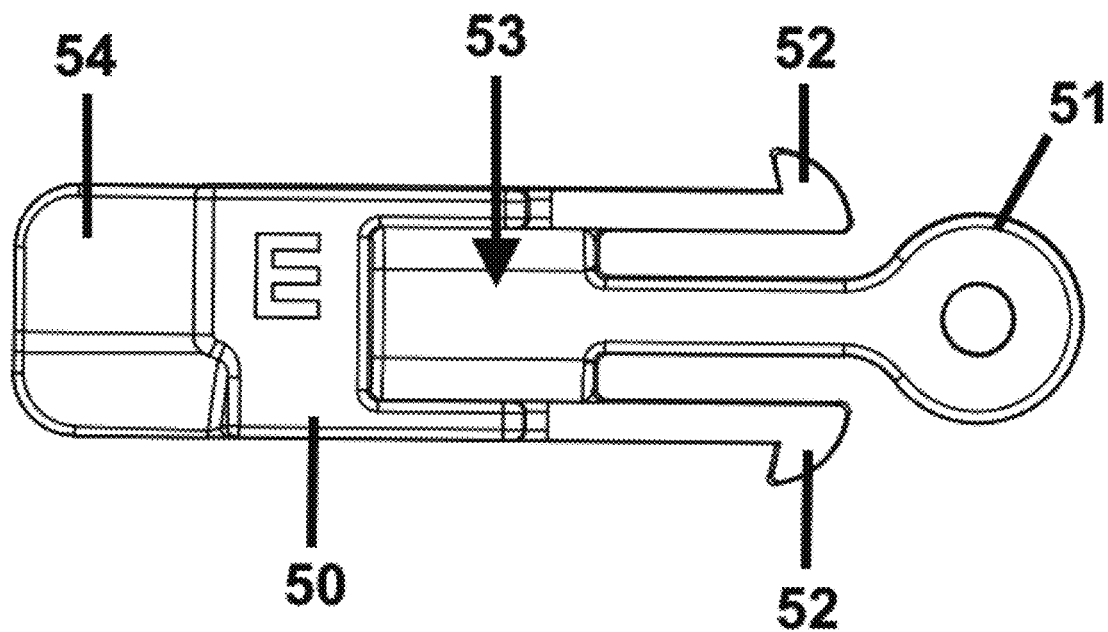
FIG. 28 presents the bottom view of the latch pin attached to the movement structure, detailing its embodiment.
Figure 29:
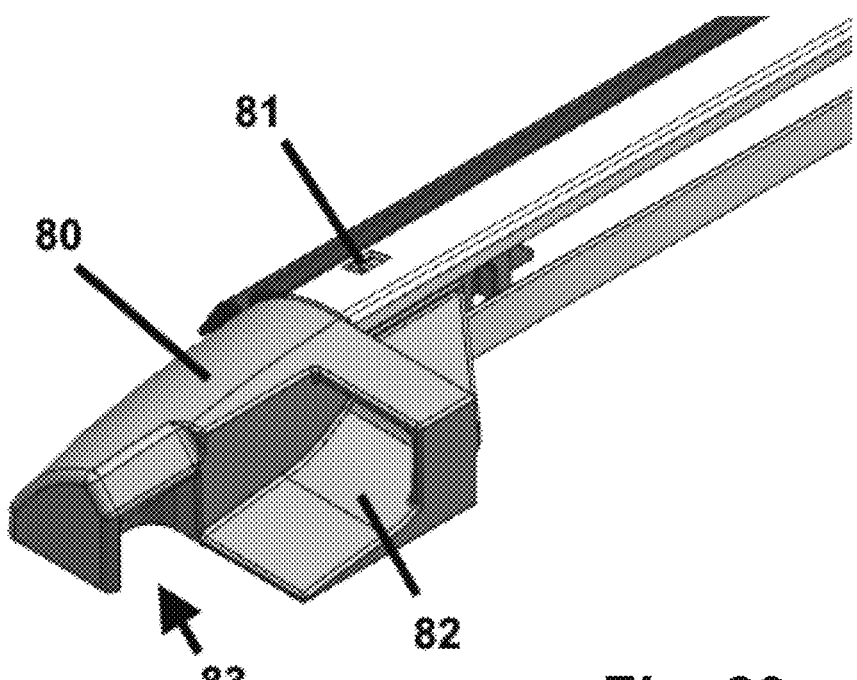
FIG. 29 shows the perspective view of the receiving terminal of the locking assembly arranged along the side profile, detailing its embodiment.

The actuators (20) are fitted laterally along the profile (10) and tracked through the projections (151) and (152) positioned with the grooves (22) and (23), as shown in FIG. 7.

Locking structures (30) are fitted to the ends of the profile (10) provided with projections (31) that allow the fitting with the profile (10) through a click, so that the projections (31) are provided with a matching tooth that fit with the holes (16) arranged in the profile, facilitating the fixing and fitting system between the structures.

The locking structure (30) is endowed with projections (32) spaced apart from each other that allow the positioning and movement of the structure (40) by fitting and fixing the locking assembly, said projections (32) having a rectangular-shaped opening (321) for the positioning and displacement of the drive pin (50).

The structure (30) is provided in its lower portion by a relief (33) that allows the movement of the structure (40) and a relief (34) that accommodates the auxiliary part (60) for fixing the tarpaulin and arrangement of the sealing profile (14).

The auxiliary part (60) is provided with a projection (61) that fits together with the relief (34) of the structure (30) in order to allow its fixation using screws (not shown). The part (60) is sewn to the tarpaulin and when fixed allows the locking, and between the tarpaulin and the part (60) will be the part (30), and in addition the part (60) is provided with grooves (62) that allow the fitting of the sealing profile (14).

The structure (40) is provided with a bas-relief (41) that allows the positioning of the spring (411) that keeps the system tensioned and at the opposite end describes a projection (42) that allows the fitting of the structure to the terminal (80) which is fitted to the side profile, in order to allow the locking. In the central portion of the structure (40) an opening (43) is arranged that allows the positioning of the latch pin (50), said opening (43) having a projection (431) for positioning the spring. The frame (40) is fitted to the frame (30) by sliding between the projections (32) and next to the relief (33).

The structure (40) is also provided with an oblong hole (44) arranged between the projection (42) and the opening (43), which receives the locking pin (30A).

The latch pin (50) describes a projection (51) for fixing and fitting the drive rods (70) and projections (52) that allow the locking and fitting with the opening (43) of the structure (40). In the lower portion there is a bas-relief (53) for the positioning of the spring (531). At the opposite end, it describes a projection (54) that allows the locking of the structure to the terminal (80) next to the spacing (83).

The operating system of the locking structures (30) occurs through the positioning of the structure (40) between the projections (32) so that the opening (43) is positioned close to the rectangular opening (321) for the placement of the latch pin (50) next to the hole (43), positioning the metal pin (30A) in the hole (322) located in the rods (32) and matching with the hole (322) of the part (30) and the oblong (44) of the part (40), preventing the system from dismantling, in addition to limiting the movement of the part (40) that moves slidingly with the pin (30A).

Thus, the pin (30A) is what guarantees the locking of the structure (40) with the structure (30), so that the pin (30A) serves as a limiter to the movement of the structure (40).

The spring (411) allows the tensioning of the structure (40) with the structure (30) in order to move the profile (10) away from the terminal (80) and, consequently, from the rectangular structure of the cover, which allows to keep the tarpaulin always stretched. When the latch pin (50) is activated, it presses the spring (531) to the projection (431) so that the pin (50) is released from the terminal (80), releasing the cover locking system.

The locking structures (30) are connected to the terminals (80) of the cover side profiles, said structures (80) having projections (81) that allow the fitting with the side profile (10A) through a click, so that the projections (81) are provided with teeth that fit with holes (16A) arranged in the profile, facilitating the fixing and fitting system between the structures.

The frames (80) are provided with a spacing (82) for positioning the projection (42) of the frame (40) and a spacing (83) for positioning the projection (54) of the latch pin (50).

Figure 30:
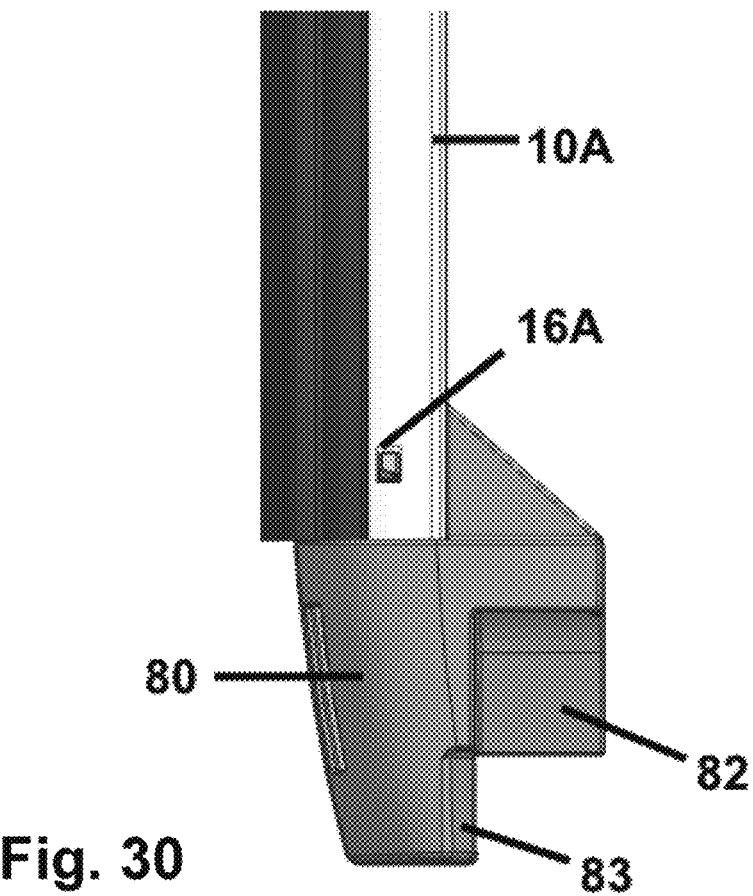
FIG. 30 shows the top view of the receiving terminal of the locking assembly arranged along the side profile, detailing its embodiment.
Figure 31:
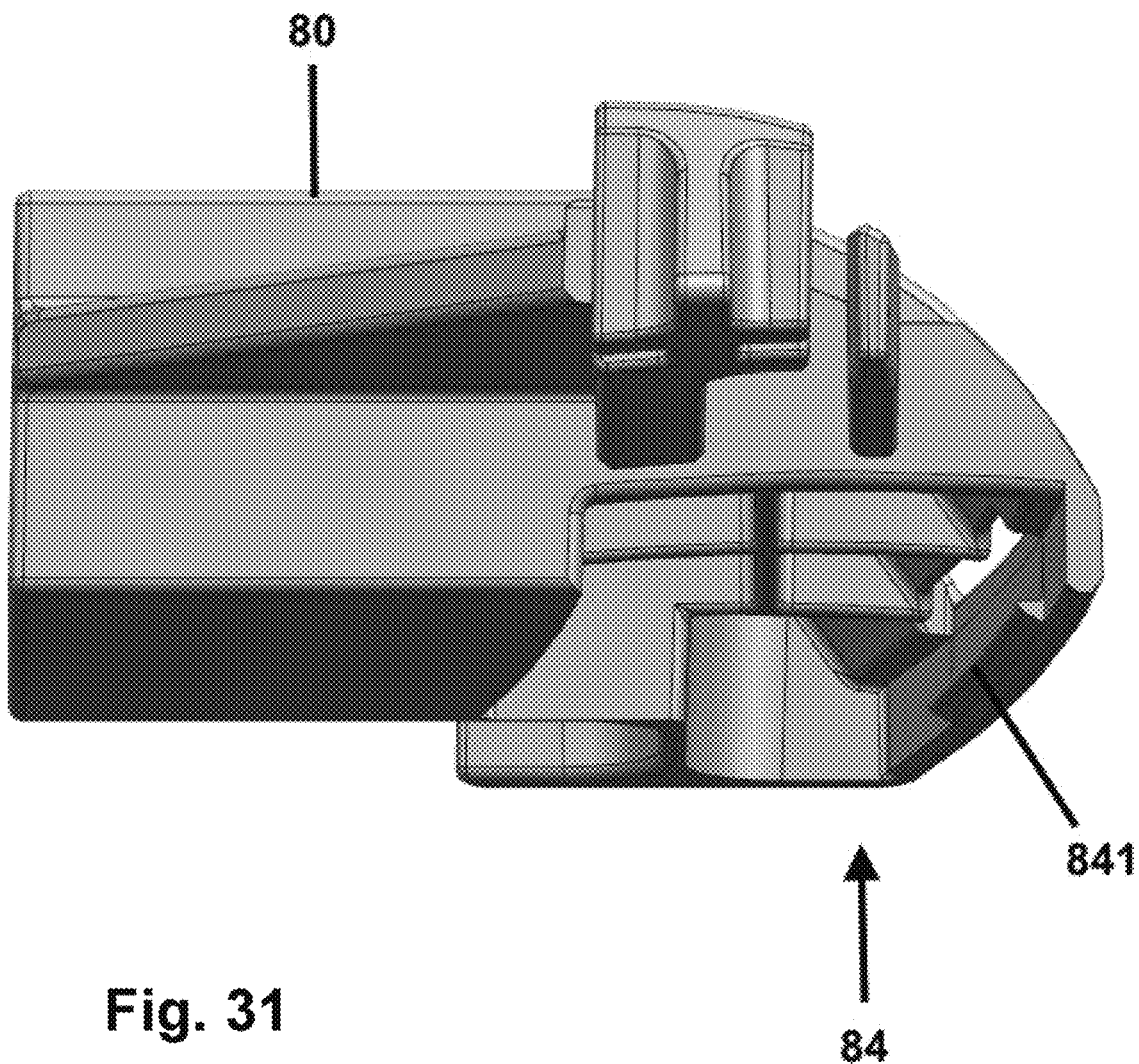
FIG. 31 shows the bottom perspective view of the locking assembly receiving terminal, detailing its embodiment.
Figure 32:
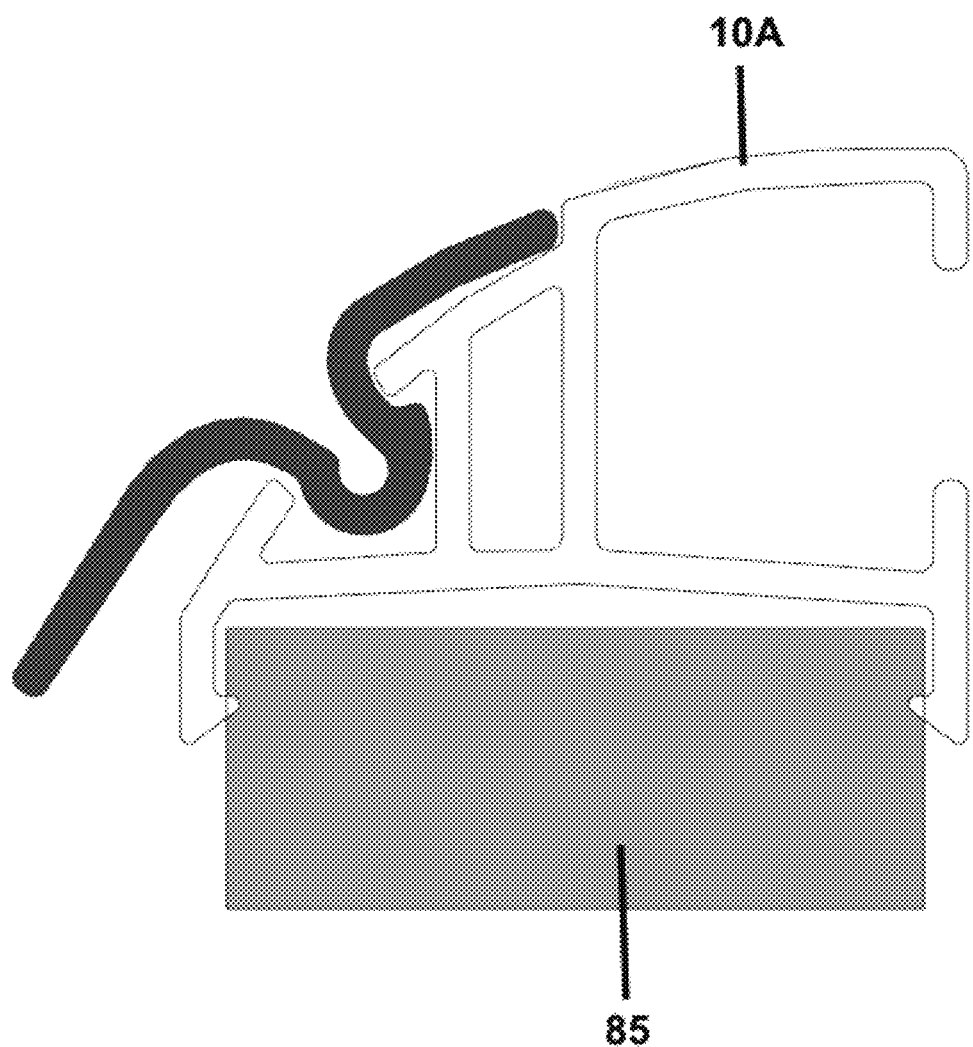
FIG. 32 shows the side profile view detailing its embodiment and the EVA arrangement in the lower portion.
Figure 33:
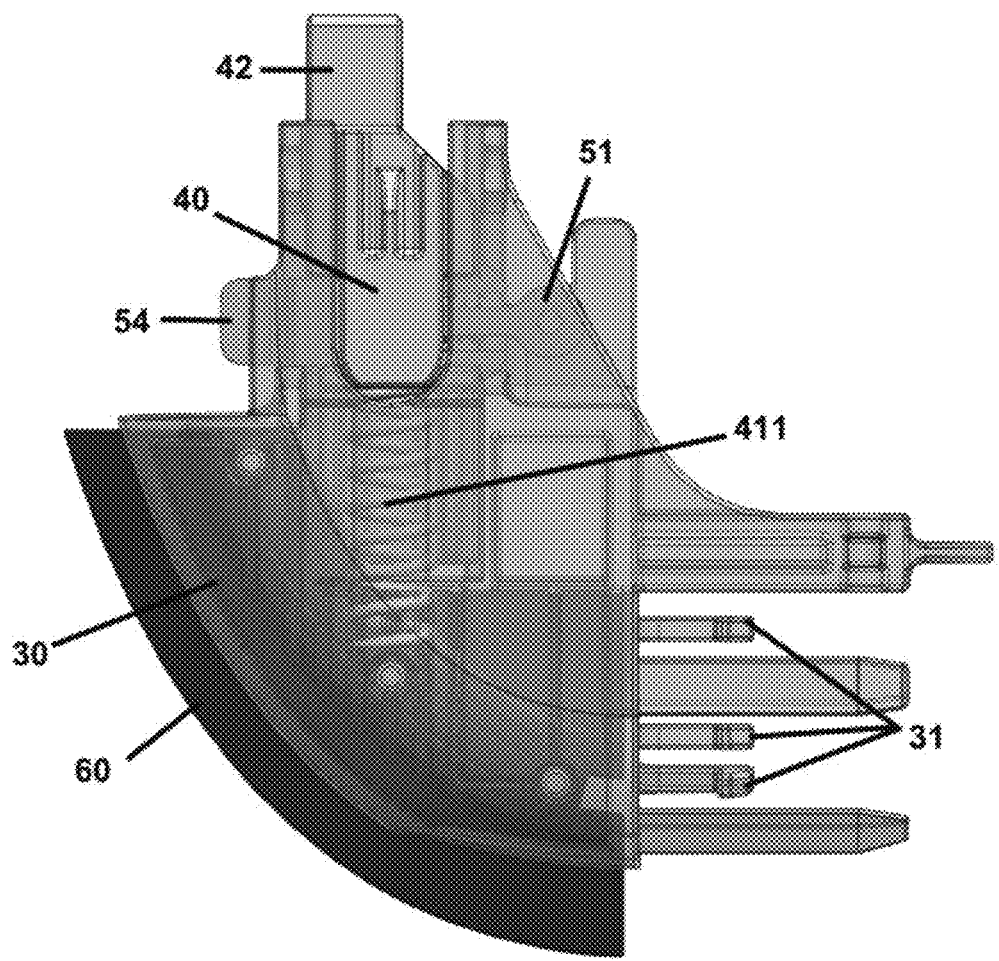
FIG. 33 shows the top view of the locking structure provided by the movement structure, latch pin and auxiliary part, detailing the positioning of the internal components and drive of the assembly.
Figure 34:
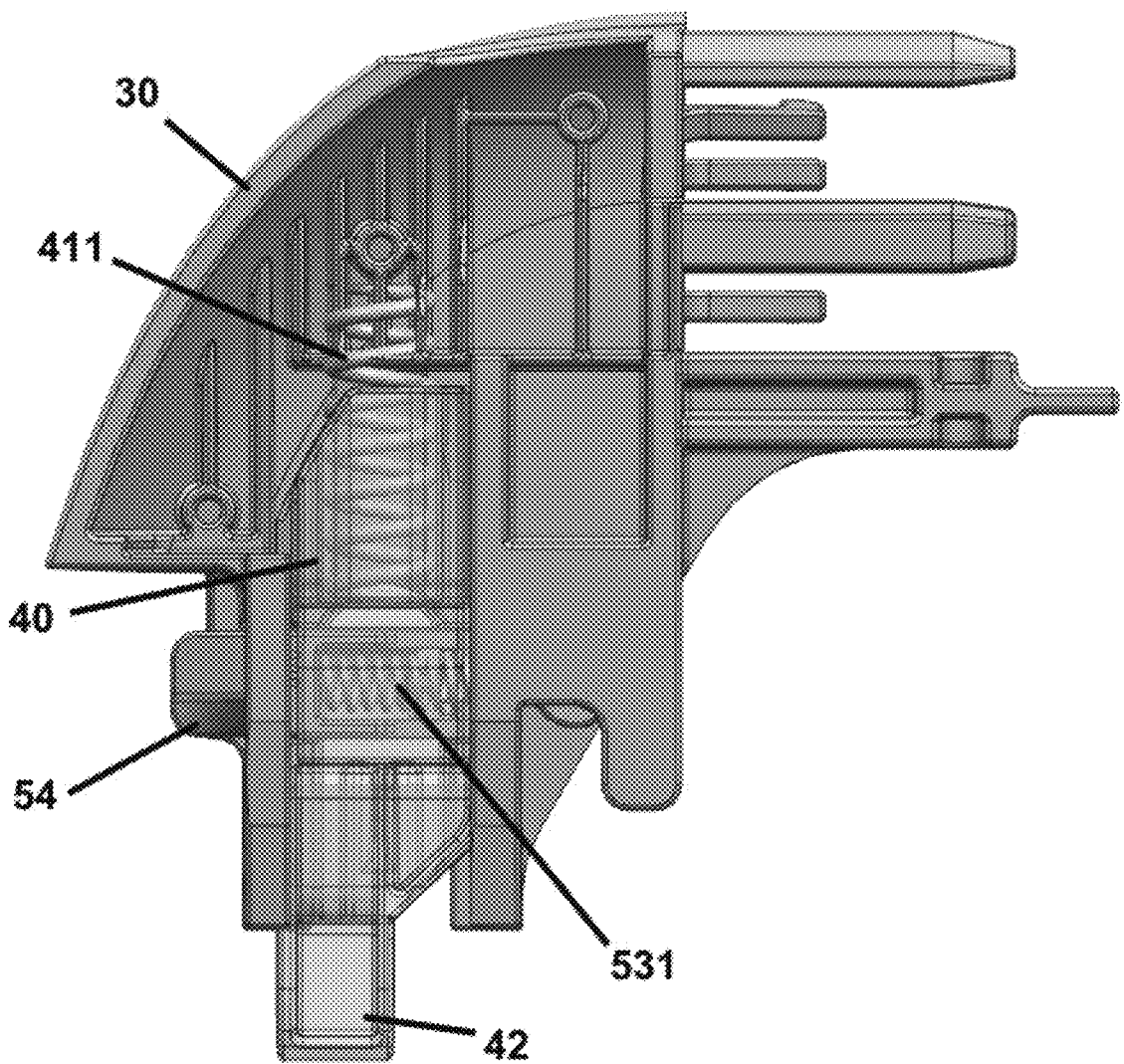
FIG. 34 shows the bottom view of the locking structure provided by the movement structure, latch pin and auxiliary part, detailing the positioning of the internal to components and drive of the assembly.
Figure 35:
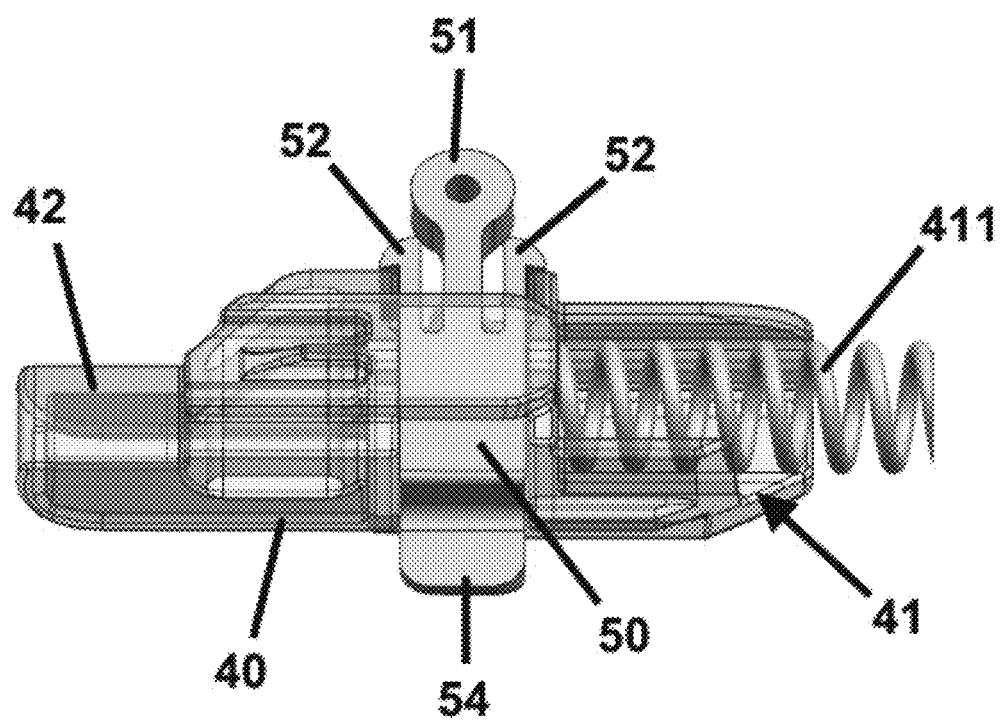
FIG. 35 shows the perspective view of the movement structure with the latch pin fitted, detailing its embodiment and fixing way between the structures.
Figure 36:
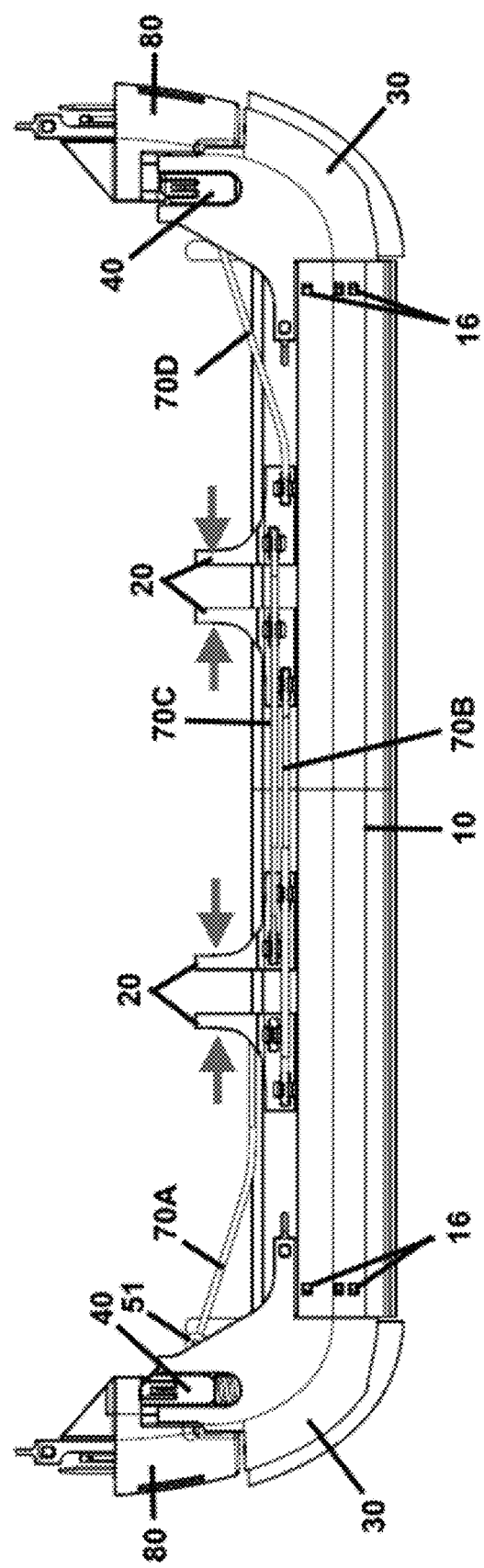
FIG. 36 shows the top view of the opening and locking system, detailing the arrangement of the rods and actuation way.

In the lower portion, the structures (80) have a spacing (84) for the positioning of an EVA part (85), said spacing (84) having a tooth (841) that allows fitting and fixing the part (85). The EVA part (85) is fitted together with the structure (80) and side profile (10A), as shown in FIGS. 30, 31 and 32.

The actuation system between the structures (30) connected to the profile (10) and the structures (80) connected to the side profiles (10A) occurs through the actuation of the actuators (20) by the user, so that with the fingers, thumb and indicator, under the profile (10), will make the drive performing the movement against the two parts (20).

The actuators (20) are positioned in pairs in the central portion of the profile (10), so that the total release of the system can take place by the actuation of only one pair of actuators (20) or by the simultaneous actuation of both pairs of actuators. This drive system is only possible due to the form of interconnection between the actuators (20), sets of rods (70) and pins (50).

Actuators (20) are modular, which allows them to be applied and adapted according to the need for using the cover model, allowing for greater variability in the system's implementation. Furthermore, the actuators (20) can be positioned one at each end, being able to be actuated by both hands in the case of a low-cost version.

The rod fixation system (70), as shown in the images, is performed by positioning the rod (70A) to the pin (50), arranged in the left portion, and connected to the first actuator (20) so that the rod (70A) is positioned with the projections (25) and fixed together with the detail (251). The rod (70B) is positioned on the projections (24) of and fixed to the detail (241) of the first, in the second the rod (70B) will be fitted only to the projection (24) and in the third actuator (20) the rod will be fitted to the projection (24) and also in detail (241). The rod (70C) is positioned on the projections (25) of the second, third and fourth actuator (20) so that the rod (70C) functions in a manner similar to the rod (70B). The rod (70D) is positioned on the projections (24) and also on the detail (241) of the fourth actuator (20) up to the pin (50), arranged in the right portion, of the profile (10).

The actuator system (20), as shown in the images, will have four rods (70A), (70B), (70C) and (70D) with two rods being connected to the pins (50) and the other two connected between the actuators (20) which allows the transmission of movement.

The rods (70A), (70B), (70C) and (70D) are fixed with the projection (24) and holes (241) that allow the locking the ends of each rod and projection (25), and holes (251) that allow locking the ends of each rod, so that the end of the rod is bent along the holes.

On the other hand, the actuation system by actuators (20) and rods has a modular characteristic, as it allows the use of one (1) or more actuators (20) in the same profile (10), according to the application needed and type of cover that is being used, allowing the opening way to be varied with one or two hands depending on the distance between the parts (20).

The invention claimed is:

1. A tonneau cover opening and locking system, comprising:
   a profile provided with a lower spacing wherein a plastic profile sewn on a tarpaulin will be fitted, a cavity for arranging a second sealing profile, a spacing provided for an engagement projection and a displacement projection of actuators and engagement holes of locking structures
   the actuators having a first projection provided with a first groove that allows fitting together with the displacement projection and a second groove that fits together with the engagement projection of the profile, the first projection having an ergonomic shape for positioning a user's fingers, the actuators have second projections provided with second holes and third projections provided with third holes and are laterally fitted together to the profile and threaded through the engagement projection and the displacement projection positioned along the first groove and the second groove;
   the locking structures are provided with fourth projections spaced apart from each other that allow the positioning of a structure for fitting and fixing a locking assembly, the fourth projections having a rectangular shaped opening for the positioning and displacement of a drive pin, the locking structures which are provided in a lower portion by a first relief allowing the movement of the structure for fitting and fixing the locking assembly and a second relief accommodating an auxiliary part for fixing the tarpaulin and arrangement of the second sealing profile, the auxiliary part which is provided with a fifth projection that fits together with the second relief of the locking structures so to allow the locking structures' fixation through screws, and the tarpaulin is sewn;
   the structure for fitting and fixing the locking assembly is provided with a first bas-relief allowing the positioning of a first spring that keeps the tonneau cover opening and locking system tensioned comprises a sixth projection that allows the fitting of the terminal structure together with a terminal structure which is fitted to a side profile, and in a central portion of the structure for fitting and fixing the locking assembly there is an opening which allows the positioning of a latch pin, the opening having a seventh projection for positioning the first spring;
   the structure for fitting and fixing the locking assembly is fitted to the locking structures sliding between the fourth projections and next to the first relief, and the structure for fitting and fixing the locking assembly is also provided with an oblong hole, arranged between the sixth projection and the opening which receives the a locking pin;
   the latch pin has an eighth projection for fixing and fitting drive rods and ninth projections that allow the locking and fitting with the opening of the structure for fitting and fixing the locking assembly and in a lower portion the structure for fitting and fixing the locking assembly has a second bas-relief for positioning a second spring, and comprises a tenth projection that allows the locking of the structure to the terminal with a second spacing;
   the actuators are provided with four drive rods with two of the four drive rods being connected to the latch pin and the drive pin and the other two of the four drive rods being connected between the actuators which allows a motion transmission, the four drive rods are fixed together with the second projections and second holes allowing locking each of the four drive rods respective ends and the third projection and the third holes allowing locking of each of the four drive rods respective ends, so that each of the four drive rods ends is bent with the second holes and/or third holes; and
   the terminal is provided with a first spacing for positioning the sixth projection of the structure for fitting and fixing the locking assembly, the second spacing for positioning the tenth projection of the latch pin, a third spacing for positioning of an EVA part, the third spacing having a first tooth that allows the fitting and fixation of the EVA part, and the EVA part is fitted together with the structure and the side profile.

2. The tonneau cover opening and locking system according to claim 1, wherein the plastic profile is laterally fitted in the lower spacing of the profile allowing the tarpaulin to be fixed to the profile and the fixation of the plastic profile to the tarpaulin occurs by sewing so that an edging is used, arranged on the tarpaulin edge with the plastic profile.

3. The tonneau cover opening and locking system according to claim 1, wherein the second sealing profile is fitted in the spacing cavity of the profile upwardly.

4. The tonneau cover opening and locking system according to claim 1, wherein between the tarpaulin and the auxiliary part is the locking structures and that the auxiliary part is provided with grooves that allow the fitting of the second sealing profile.

5. The tonneau cover opening and locking system according to claim 1, wherein the locking structures occur through positioning of the structure for fitting and fixing the locking assembly between the fourth projections so that the opening is positioned along the rectangular shaped opening for placing the latch pin with the opening, positioning the a metal pin in a fourth hole.

6. The tonneau cover opening and locking system according to claim 1, wherein the locking pin is what guarantees locking of the structure for fitting and fixing the locking assembly with the locking structures, so that the locking pin serves as a limit to movement of the structure for fitting and fixing the locking assembly.

7. The tonneau cover opening and locking system according to claim 1, wherein the first spring allows tensioning of the structure for fitting and fixing the locking assembly with the locking structures in order to move the profile away from the terminal.

8. The tonneau cover opening and locking system according to claim 1, wherein the latch pin when activated presses the second spring next to the seventh projection so that the latch pin is released from the terminal releasing the cover locking system of the tonneau cover opening and locking system.

9. The tonneau cover opening and locking system according to claim 1, wherein eleventh projections are provided with a second tooth that fits together with first holes arranged in the profile.

10. The tonneau cover opening and locking system according to claim 1, wherein actuation of the actuators by the user is performed with the user's fingers, thumb and index fingers, under the profile, performing movement between the of the actuators.

11. The tonneau cover opening and locking system according to claim 1, wherein the actuators are positioned in pairs in a central portion of the profile, so that a total release of the tonneau cover opening and locking system occurs by actuation of only one pair of actuators or by the simultaneous actuation of two pairs of actuators.

12. The tonneau cover opening and locking system according to claim 1, wherein the actuators are modular and activated by one or two of a users' s hands.

13. The tonneau cover opening and locking system according to claim 1, wherein actuation the actuators and the four rods has a modular characteristic, allowing the use of one or more of the actuators in the profile, allowing the opening shape to be varied with one or two hands depending on the distance between the actuators.

14. The tonneau cover opening and locking system according to claim 2, wherein the second sealing profile is fitted in the cavity of the profile upwardly.

15. The tonneau cover opening and locking system according to claim 2, wherein between the tarpaulin and the auxiliary part is the locking structures and that the auxiliary part is provided with grooves that allow the fitting of the second sealing profile.

16. The tonneau cover opening and locking system according to claim 2, wherein the locking structures occur through positioning of the structure for fitting and fixing the locking assembly between the fourth projections so that the opening is positioned along the rectangular shaped opening for placing the latch pin with the opening, positioning the a metal pin in a fourth hole.

17. The tonneau cover opening and locking system according to claim 2, wherein the locking pin is what guarantees locking of the structure for fitting and fixing the locking assembly with the locking structures, so that the locking pin serves as a limit to movement of the structure for fitting and fixing the locking assembly.

18. The tonneau cover opening and locking system according to claim 2, wherein the first spring allows tensioning of the structure for fitting and fixing the locking assembly with the locking structures in order to move the profile away from the terminal.

19. The tonneau cover opening and locking system according to claim 2, wherein the latch pin when activated presses the second spring next to the seventh projection so that the latch pin is released from the terminal releasing the cover locking system of the tonneau cover opening and locking system.

20. The tonneau cover opening and locking system according to claim 2, wherein eleventh projections are provided with a second tooth that fits together with first holes arranged in the profile.

* * * * *